Figure 1:
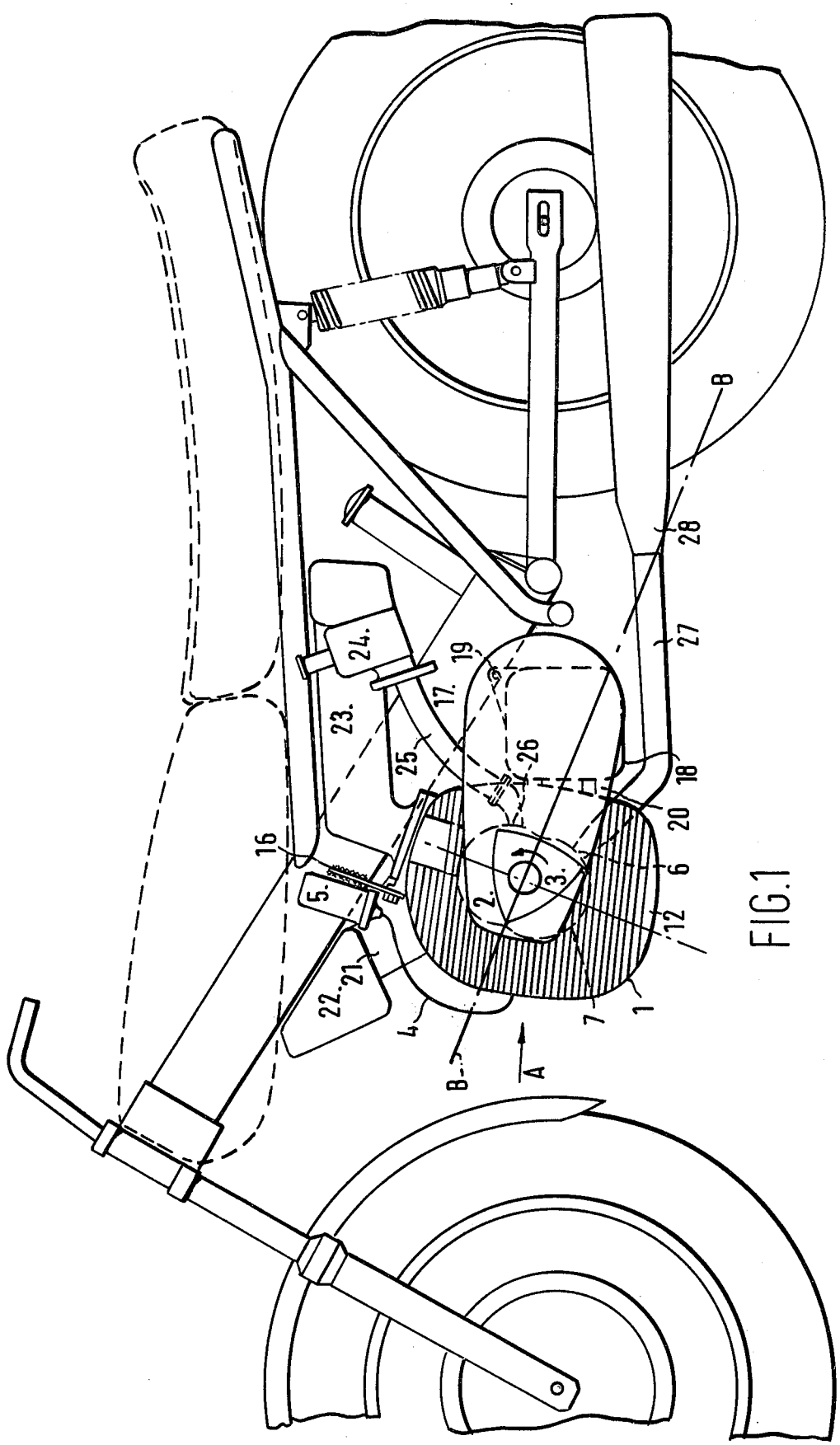

United States Patent [19]

Garside

[11] 3,915,249
[45] Oct. 28, 1975

[54] MOUNTING AND COOLING MEANS FOR A ROTARY PISTON INTERNAL COMBUSTION ENGINE ON A MOTORCYCLE

[75] Inventor: David Walker Garside, Solihull, England

[73] Assignee: Birmingham Small Arms Company Limited, Birmingham, England

[22] Filed: Apr. 23, 1973

[21] Appl. No.: 353,359

[30] Foreign Application Priority Data
Apr. 29, 1972  United Kingdom............... 19986/72

[52] U.S. Cl............................. 180/33 R; 180/33 A
[51] Int. Cl.²........................................ B62K 11/00
[58] Field of Search.... 180/33 R, 33 B, 33 C, 33 D; 123/8.01, 8.05

[56] References Cited
UNITED STATES PATENTS

| | | | |
|---|---|---|---|
| 3,134,369 | 5/1964 | Schlör | 123/8.01 |
| 3,234,922 | 2/1966 | Froede | 123/8.01 |
| 3,289,650 | 12/1966 | Bentele | 123/8.01 |
| 3,319,611 | 5/1967 | Terazawa | 123/8.01 |
| 3,757,882 | 9/1973 | Honda | 180/33 R |

FOREIGN PATENTS OR APPLICATIONS
1,115,310  5/1968  United Kingdom............... 180/33 R

OTHER PUBLICATIONS
Ocheltree, Motorcyclist, Jan., 1974, pp. 24–31.
Nutting, Motor Cycle, Aug., 1974, pp. 14–15.
"Cycle World," pp. 30–33, Jan., 1971.

*Primary Examiner*—David Schonberg
*Assistant Examiner*—Terrance L. Siemens
*Attorney, Agent, or Firm*—Norris & Bateman

[57] ABSTRACT

A motorcycle having an air cooled rotary piston internal combustion engine mounted on the motorcycle frame with its mainshaft oriented transversely of the frame and the engine minor axis being either horizontal or rearwardly, downwardly inclined, the engine being cooled by natural airflow only without need of an axial fan or blower.

7 Claims, 2 Drawing Figures

U.S. Patent  Oct. 28, 1975  Sheet 1 of 2  3,915,249

MOUNTING AND COOLING MEANS FOR A ROTARY PISTON INTERNAL COMBUSTION ENGINE ON A MOTORCYCLE

This invention relates to the mounting of air-cooled rotary piston engines on motor cycles, which term is used herein as encompassing similar single or narrow track vehicles, such as, for example, snowmobiles and scooters, where the context permits. The invention particularly concerns the mounting of rotary engines of the so called Wankel kind in which a rotor of substantially equilateral triangular shape, but having arcuate sides, is mounted on an eccentric mainshaft to rotate in planetary manner within a cavity of two-lobed epitrochoidal shape in a stationary housing, three working chambers being formed between the rotor and the cavity wall which vary in volume as the rotor rotates.

A common method of air-cooling the housing of an engine of the kind referred to has been to provide axial ducts in the housing and to force cooling air through said ducts by an engine driven fan. The disadvantages of such a system are that a portion of the power output of the engine it utilised to drive the fan, the accommodation of the fan increases the overall length of the engine, and in the case of multi-rotor engines the axial flow of air through the housing may not adequately cool the intermediate transverse plates between rotors. Furthermore in the case of multi-rotor engines the cooling air passing through the housing bounding a rotor becomes heated and therefore cools the housing bounding subsequent rotors to a decreasing extent.

An important feature of an engine of the kind referred to is that the hot phases of the engine cycle, that is combustion, expansion and exhaust are essentially contained within one lobe of the epitrochoidal cavity, hereinafter referred to as "hot lobe," and the cooler phases, that is induction and compression are contained within the other lobe, hereinafter referred to as "cool lobe." It is important therefore that the cooling system for the housing must be capable of extracting a greater amount of heat from the hot lobe than from the cool lobe if excessive temperatures and thermal stresses are to be avoided in the housing.

It is an object of the present invention to provide a means of mounting an engine of the kind referred to on a motor cycle whereby the air flow generated when the motor cycle is in motion cools the engine, no auxiliary air flow generating means being therefore required.

According to the invention a motor cycle has a rotary piston engine of the kind referred to mounted transversely with the axis of its mainshaft normal to the vertical plane containing the longitudinal centre line of the motor cycle and with the minor axis of the two-lobed epitrochoidal shaped cavity in the housing substantially horizontal or inclined downwardly towards the rear of the motor cycle, inlet and exhaust ports disposed to the rearward side of the major axis of the two-lobed epitrochoidal cavity, and the lowermost cavity lobe being the hot lobe.

The minor axis will usually be downwardy inclined at an angle to the horizontal of not more than 45°. We prefer that the angle of inclination should be less than 40°and preferably to within the range of 15°–25°.

With the engine so mounted on a motor cycle it is possible to achieve the required cooling of the housing by providing the housing with external cooling fins, which are preferably axially spaced circumferential fins, the air flow generated when the motor cycle is in motion being sufficient to achieve the required cooling rate. Experiments have shown that the air velocity available for cooling the engine in a moving motor cycle is greater at points closer to the ground than at points further from the ground. The orientation of the engine ensures that the portion of the housing bounding the hot lobe is directly and freely exposed to the higher velocity cooling air flow and this factor, preferably in conjunction with a greater surface area of finning on this portion of the housing ensures the necessary higher rate of heat rejection from said portion. The surface area of finning on the hot lobe portion of the housing can be increased by increasing the depth of the fins on this portion or alternatively by using more closely spaced fins on this portion.

The end plates closing the housing will usually be provided with cooling fins which are preferably formed as straight parallel fins on the external vertical faces of the end plates, the ribs being horizontal or at an angle generally not more than 20°to the horizontal when the engine is mounted on the motor cycle. Similarly in the case of multi-rotor engines it will usually be necessary to provide the intermediate plates between epitrochoidal cavity containing segments of the housing with cooling fins.

The invention is particularly, but not exclusively, applicable to rotary engines which have air cooled rotors, a passage in the rotor forming part of the induction passage whereby inducted air flows through and cools the rotor. In the case of multi-rotor engines the cooling effect which can be produced on the intermediate plates by providing inlet air passages therein reduces the amount of finning which is necessary on the intermediate plates.

The orientation of an engine mounted on a motor cycle according to the invention will usually allow the gear box to be secured to the rear of the engine, in a manner analagous to the conventional mounting of a reciprocating engine and gear box on a motor cycle, with the induction and exhaust pipes passing above and below the gear box respectively.

Figure 2:
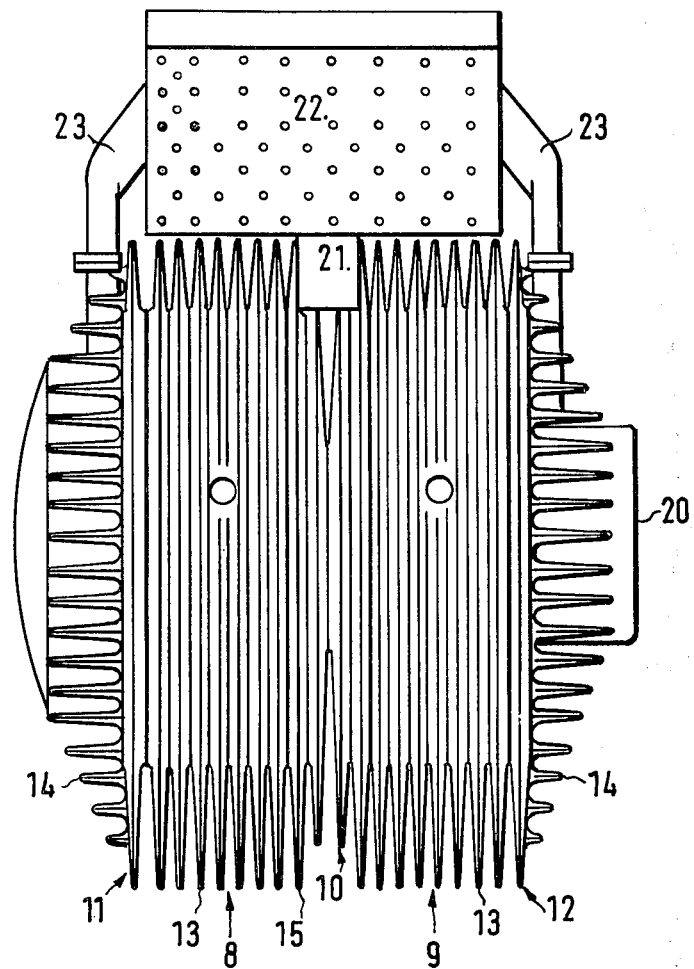

A preferred embodiment of the invention will now be described, by way of example, with reference to the accompanying drawings in which:

FIG. 1 is a side view of a motor cycle according to the invention with a twin rotary piston engine mounted thereon and FIG. 2 is a front view of the engine in the direction A shown in FIG. 1.

As shown in FIG. 1 the engine 1 has a two lobed epitrochoidal cavity 2 in which rotor 3 rotates in planetary manner, the rotor rotating in the direction shown. The cavity for the second rotor lies coaxially behind cavity 2 and is not therefore visible in FIG. 1. The engine is mounted such that the minor axis B—B of the epitrochoidal cavity 2 is downwardly inclined towards the rear of the vehicle, the angle between the minor axis and the horizontal being about 20°in this embodiment. A spark plug (not shown) is positioned near to the intersection of the minor axis and the forward wall of the epitrochoidal cavity 2 and is connected by high voltage cable 4 to the secondary winding of an ignition coil 5 in conventional manner. The peripheral exhaust port 6 is positioned below the point of intersection of the minor axis B—B and the rearward wall of the epitrochoidal cavity 2 and thus the lower lobe 7 of the epitrochoidal cavity is the hot lobe of the engine, that is it contains the hot combustion, expansion and exhaust phases of the engine cycle. It is apparent from FIG. 1 that the portion of the housing containing lobe 7 of the epitrochoidal cavity 2 is more exposed to the flow of cooling air generated when the motor cycle is in motion than is the portion of the housing containing the cool lobe.

As can be seen more clearly from FIG. 2 the housing of the engine comprises two cavity containing housing segments 8 and 9 separated by an intermediate plate 10 and closed at either end by end plates 11 and 12. The housings 8 and 9 have external circumferential cooling fins 13 which correspond in profile to the shape of the end plates 11 and 12, as shown in FIG. 1. It can be seen from FIG. 1 that the epitrochoidal cavity is not centrally disposed in relation to the outer profile of the end housing and it is thus arranged that the fins are of greater depth on those portions of the housing segments 8 and 9 which contain the lower lobes of the epitrochoidal cavities, and this geater area of finning, in conjunction with the aforementioned orientation of the engine, results in the achievement of the higher cooling rate which is necessary from those portions of the housing.

It is of course necessary to effectively cool the end plates 11 and 12 and the intermediate plate 10 and for this purpose the end plates 11 and 12 are provided with substantially horizontal cooling fins 14 and the intermediate plate with circumferential cooling fins 15.

The engine is secured to a bracket 16 carried by the down-tube 17 of the motor cycle frame and a gear box 18 bolted to the rear of the engine is secured to the downtube 17 at 19.

It is advantageous to secure the gear box 18 to the rear of the engine, in a manner which is analagous to conventional motor cycle practice with reciprocating engines, because the gear-box forms a heat sink which aids the cooling of the rear portion of the engine, which portion is largely shielded from the cooling flow of air and therefore little cooled by the air flow. The gear box itself may have external cooling fins which may assist in the overall dissipation of heat. The gear box is coupled to the mainshaft of the engine by a chain drive contained within primary chain case 20, one half of which is formed integrally with the end plate 12 and the other half forms a removable cover.

The engine shown is of the type in which the inducted air flows through and cools the rotor before being inducted into the working chambers of the engine. The air inlet duct 21, which has an air filter 22, feeds air to suitably disposed ports in the intermediate plate 10 from whence the air passes through the interior of the rotors to ports in the end plates 11 and 12 which are connected by ducts 23, carburetors 24 and pipes 25 to the inlet ports 26. The cool induction air entering the intermediate plate 10 via duct 21 assists in the cooling of the intermediate plate 10. Oil is dispensed into the air flowing through duct 21 by a suitable oil metering pump from an oil tank formed by the down-tube 17 of the frame. It will be appreciated that this engine is merely exemplary and the invention is equally applicable to rotary piston engines using other rotor cooling methods, for example, having oil cooled rotors.

The exhaust gases leaving epitrochoidal cavity 2 through exhaust port 6 pass through exhaust pipe 27 which passes below the gear box 18 and exhaust silencer 28. With a twin rotor engine it is usually preferable to have two silencers, one for each rotor, but it is also possible to connect the exhaust pipes from each rotor to a single silencer.

Whilst the invention has been described with reference to an engine having circumferential cooling fins which are deeper on the portion of the housing which bounds the hot lobe, it will be understood that in some instances axial cooling fins may be acceptable. Also the area of finning on the hot portion of the housing may be increased by increasing the number of fins on this portion rather than by increasing the depth of the fins.

What I claim is:

1. A motor cycle having an engine comprising a housing with a two-lobed epitrochoidal cavity therein, a rotor of generally triangular shape movable within said cavity, a mainshaft on which the rotor is mounted for planetary motion about the axis of the mainshaft such that the apices thereof maintain sliding contact with the peripheral wall of the cavity and thereby form three working chambers which vary in volume as the rotor rotates, an inlet port communicating with the cool lobe of the cavity which bounds the cooler phases of the engine cycle, and an exhaust port which communicates with the hot lobe of the cavity which bounds the hot phases of the engine cycle, the engine being mounted with the axis of the mainshaft substantially normal to a vertical plane containing the longitudinal center line of the motor cycle, with the minor axis of the two-lobed epitrochoidal cavity disposed substantially horizontal or inclined downwardly towards the rear wheel of the motor cycle, with the inlet and exhaust ports for each cavity disposed to the rearward side of the major axis of the two-lobed epitrochoidal cavity, and with the lowermost lobe of the cavity being the hot lobe, the engine housing having a multiplicity of axially spaced circumferential cooling fins formed thereon whereby when the motor cycle is in motion the engine is cooled solely by the natural air flow generated by such motion, the total surface area of the cooling fins on the housing bounding the hot lobe being greater than the total surface area of the cooling fins on the housing bounding the cool lobe.

2. A motor cycle according to claim 1 wherein the fins on the part of the housing bounding the hot lobe are deeper than the fins on the remainder of the housing.

3. A motor cycle according to claim 1 wherein the housing comprises a central portion having a two-lobed epitrochoidal bore therethrough and two end plates forming axially spaced end walls of the two-lobed epitrochoidal cavity, the central portion having a multiplicity of axially spaced circumferential cooling fins formed thereon and the end plates having a multiplicity of substantially horizontal cooling fins formed thereon.

4. A motor cycle according to claim 1 wherein the minor axis of the two-lobed epitrochoidal cavity is inclined to the horizontal at an angle of not more than 45°.

5. A motor cycle according to claim 4 wherein the minor axis of the two-lobed epitrochoidal cavity is inclined to the horizontal at an angle of 15° to 25°.

6. A motor cycle according to claim 1 wherein a gearbox is secured to a portion of the housing which lies between said inlet and exhaust ports and a pipe leading to the inlet port passes over the gear-box and a pipe leading to the exhaust port passes under the gear-box, the gear-box containing gearing drive coupled to the mainshaft of the engine.

7. A motor cycle having an engine comprising a housing having a plurality of two-lobed epitrochoidal cavities therein, an intermediate plate disposed between each adjacent pair of said cavities, a rotor of generally triangular shape mounted within each cavity, a mainshaft on which the rotors are mounted for planetary motion about the axis of the mainshaft such that the apices of each rotor maintain sliding contact with the peripheral wall of its associated cavity and thereby form three working chambers which vary in volume as the rotor rotates, an inlet port communicating with the cool lobe of each cavity which bounds the cooler phases of the engine cycle, and an exhaust port communicating with the hot lobe of each cavity which bounds the hotter phases of the engine cycle, the engine being mounted with the axis of the mainshaft substantially normal to a vertical plane containing the longitudinal center line of the motor cycle, with the minor axis of the two-lobed epitrochoidal cavities disposed parallel to each other and disposed substantially horizontal or inclined downwardly towards the rear wheel of the motor cycle, with the inlet and exhaust ports for each cavity disposed to the rearward side of the major axis of the two-lobed epitrochoidal cavity, and with the lowermost lobe of each cavity being the hot lobe, the housing members and the intermediate plates having a multiplicity of axially spaced circumferential cooling fins formed thereon whereby when the motor cycle is in motion the engine is cooled solely by the natural air flow generated by such motion, and the total surface area of the cooling fins formed on the portions of the housing members bounding the hot lobe being greater than the total surface area of the cooling fins formed on the portions of the housing members bounding the cool lobes.

\* \* \* \* \*